Patented June 24, 1930

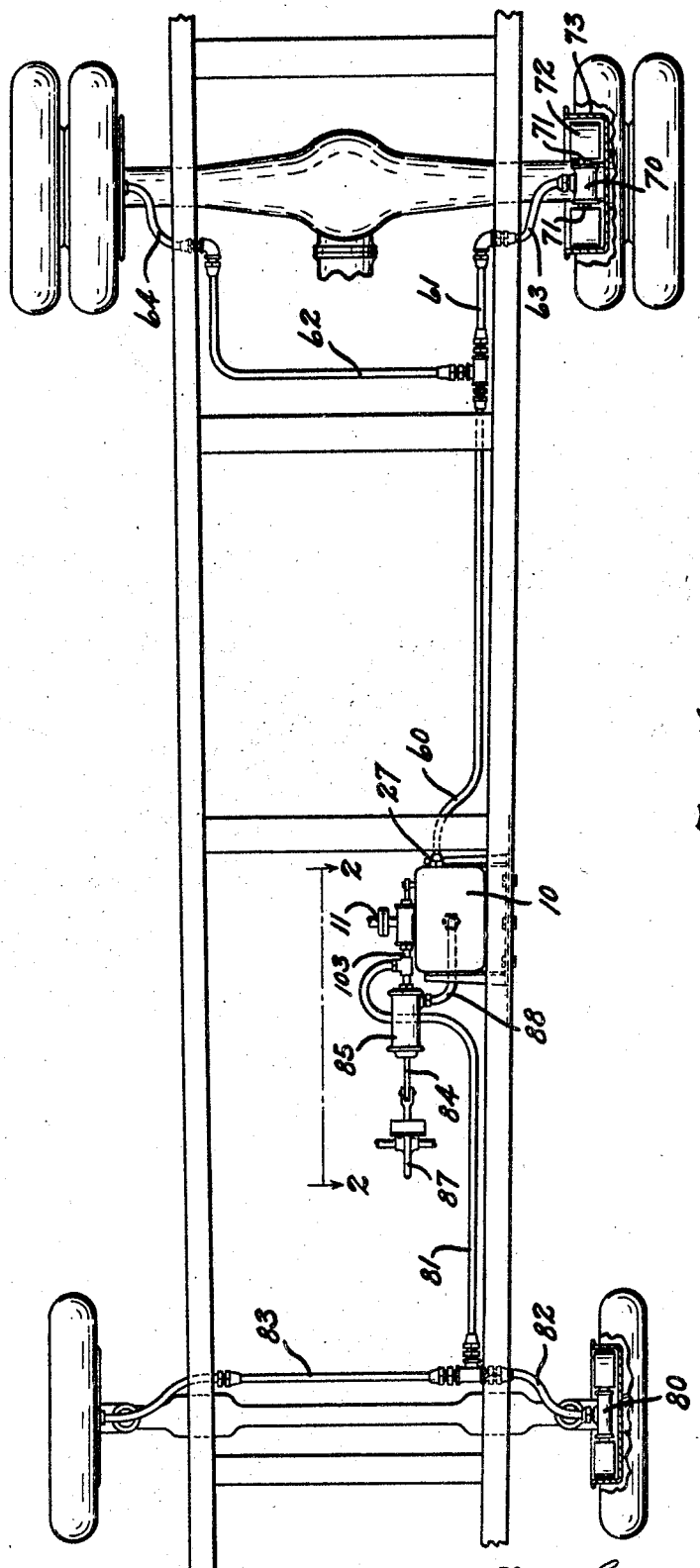

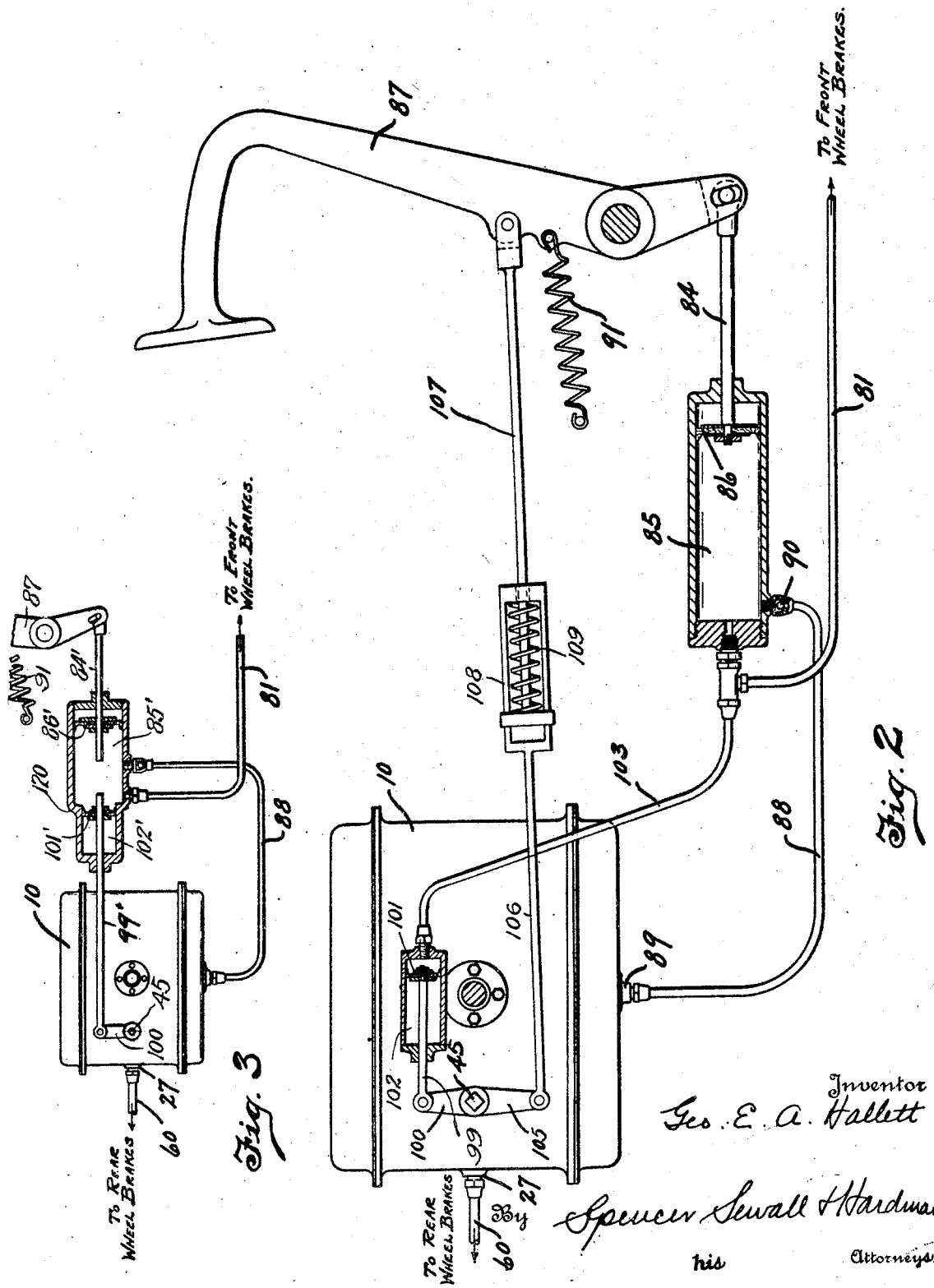

1,768,355

UNITED STATES PATENT OFFICE

GEORGE E. A. HALLETT, OF DAYTON, OHIO, ASSIGNOR TO GENERAL MOTORS RESEARCH CORPORATION, OF DAYTON, OHIO, A CORPORATION OF DELAWARE

HYDRAULIC BRAKING SYSTEM FOR MOTOR VEHICLES

Application filed June 23, 1925. Serial No. 39,076.

This invention relates to hydraulic braking systems for vehicles, especially the larger motor vehicles.

An object of the invention is to provide a foot power means for applying the brakes on one set of wheels and a servo-pump means for applying the brakes on another set of wheels, both means being operated simultaneously.

Another object is to so coordinate the two sets of brake mechanism that the braking effect on the one set of wheels will always be proportional to the braking effect on the other set of wheels. It is obvious that the operator can easily feel the braking effect supplied by the manual means and since the braking effect supplied by the servo-pump is always proportional thereto the operator will therefore feel a resisting force which will bear a predetermined ratio to the entire braking effect.

Another object is to so coordinate the braking mechanism that the front wheel brakes will always have a somewhat less braking effect than the rear wheels, and hence there will be no possibility of the front wheels being locked while the rear wheels are yet rotating which obviously would render steering impossible.

Another object is to provide means for ordinarily operating the servo-pump control valve proportionately to the pressure built up by the foot pump.

Another object is to provide a safety mechanical means for operating the servo-pump control valve in case of failure of the hydraulic mechanism for operating said valve. It is thus seen that two independent hydraulic brake systems are provided which are operable by the same foot pedal. The front wheel brake system will still operate in case of the emergency of the servo-pump or any of the rear braking system failing to operate. Also the rear wheel brake system will still function properly in the event of failure of any part of the front wheel brake system. It is therefore clear that the brakes can fail entirely only in case of the separate failure of each of the two independent systems at the same time, which is most unlikely to happen. The foot pedal is the only part which is common to the two systems and this one simple part can easily be made sufficiently strong and reliable to insure against failure.

Further objects and advantages of the present invention will be apparent from the following description, reference being had to the accompanying drawings, wherein a preferred form of embodiment of the present invention is clearly shown.

In the drawings:

Fig. 1 is a somewhat diagrammatic plan view showing the invention applied to an automobile chassis.

Fig. 2 is an enlarged side elevation, also diagrammatic, looking in the direction of arrows 2—2 in Fig. 1.

Fig. 3 is similar to Fig. 2 but shows a modification.

Like or similar reference characters refer to like or similar parts throughout the several views.

Figure 4:
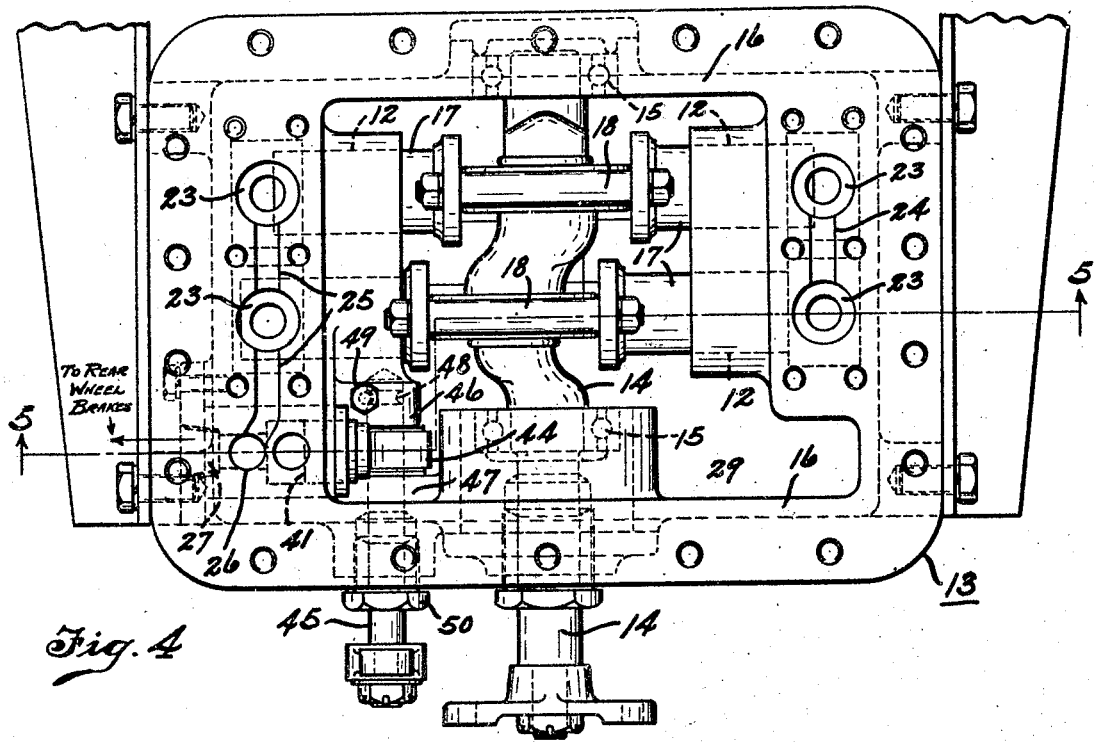
Fig. 4 is a plan view of the servo-pump with certain upper parts removed to more clearly show the interior construction.

Numeral 10 designates the servo-pump in its entirety. Pump 10 is continuously driven from the automobile propeller shaft by means of the short transverse shaft 11 which is suitably geared to said propeller shaft. The pump 10 comprises two pairs of opposed cylinders 12 which are cast integral in a box-like casting 13. The two-throw crank shaft 14 is suitably mounted upon bearings 15 supported in the side walls 16 of the box-like casting 13. The two crank throws reciprocate the two pairs of pistons 17 by means of Scotch yokes 18 which are clearly illustrated in Figs. 4 and 5. A stationary guide bracket supports the guides 20 which cooperate with the Scotch yokes 18 to hold them in their vertical position as they reciprocate to-and-fro. Each of cylinders 12 has a spring pressed inlet valve 21 and a similar outlet valve 22. The outlet passages 23 of each pair of cylinders are interconnected by the passages 24 and 25 (see Fig. 4). Also the two passages 24 and 25 are interconnected by the cross duct 26, which therefore connects the outlets of all four cylinders to the passage 25. Passage 25 leads into the vertical passage 26, which in turn is branched into the pump delivery port 27 and the by-pass duct 28 which leads back to the oil reservoir 29 within the pump casting 13 (see Fig. 5). The box-like casting 13 has a bottom plate 30 and a top plate 31 secured thereto by means of cap screws 32, suitable leak-proof gaskets being inserted between the flanges of the cover plates 30 and 31 and the corresponding flanges on casting 13. The oil level in reservoir 29 is maintained approximately as shown at 33 in Fig. 5.

Figure 5:
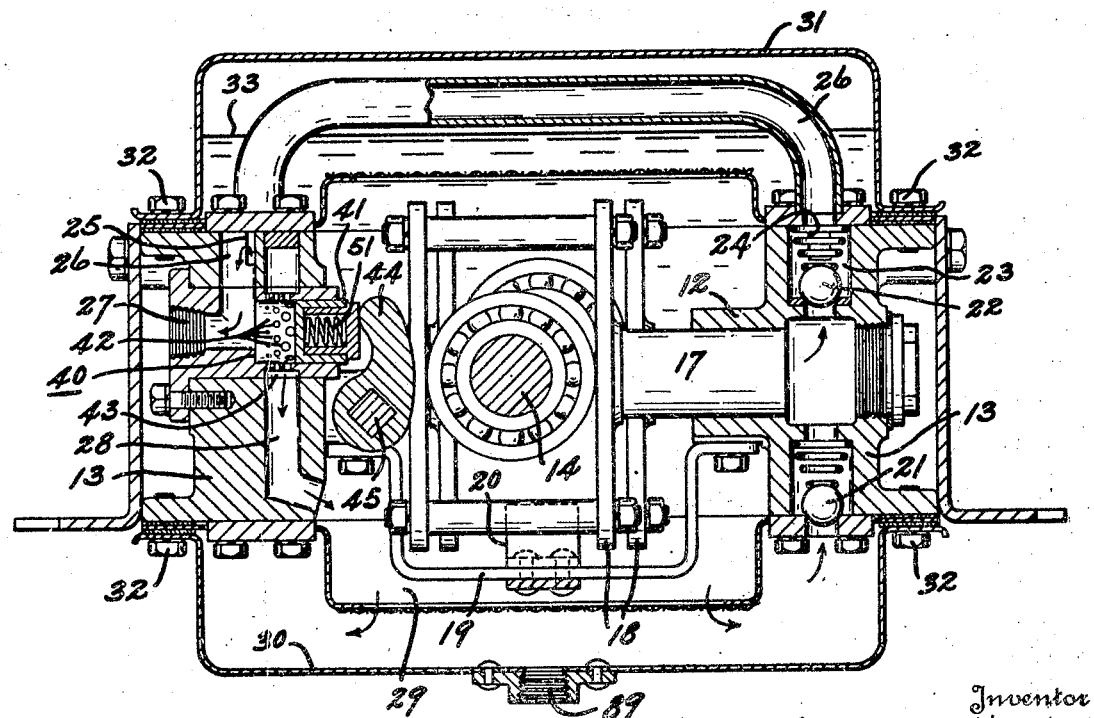
Fig. 5 is a section on line 5—5 of Fig. 4, and shows the pump by-pass valve in full open position.

A by-pass valve 40 is provided in the by-pass duct 28 whereby said duct 28 may be progressively closed and thereby cause the pump to build up a high oil pressure at the delivery port 27 instead of permitting a free circulation of oil through said by-pass duct 28 (see Fig. 5). This valve 40 comprises a piston 41 which moves to open or close more or less of the small oil ports 42 which permit the passage of oil from duct 26 into the annular space 43 and thence into by-pass duct 28. Piston 41 is actuated in its closing movement by the cam arm 44 which is rotated by shaft 45 upon which it is fixed. Shaft 45 is suitably mounted in bearings 46 and 47. Bearing 46 is shown in Fig. 4 as simply a bore in a suitable boss integral with the cylinder casting. The inner end of shaft 45 has an annular groove 48 into which the lower end of cap screw 49 projects, thus holding shaft 45 against longitudinal movement but permitting its rotary movement. Bearing 47 is provided with a suitable packing gland 50 to prevent leakage of oil from reservoir 29 around shaft 45. It will be obvious that when shaft 45 is rotated counter-clockwise (as viewed in Fig. 5) the cam arm 44 will move piston 41 to progressively close the small ports 42. The ports 42 are graded down in size and arranged so that the larger ports are closed first and the smallest ports last. As soon as the by-pass duct is even partially restricted by this movement of piston 41 the pump will deliver a small amount of oil through delivery port 27 to the brake operating cylinders. When no more oil can be delivered to the brake cylinders the pressure throughout the delivery lines immediately rises and this built-up pressure in duct 26 acts against piston 41 to resist its closing movement. It will now be clear that the force required to hold piston 41 in a partially closed position will be directly proportional to the pressure in the brake cylinders. Preferably a small super-atmospheric pressure is maintained in the brake cylinders and delivery lines even when the brakes are loose, in order to insure that these ports remain at all times completely filled with oil. Therefore the piston 41 is shown in Fig. 5 as constructed of two telescoping parts which are yieldably urged apart by the spring 51. It will be clear that spring 51 will yieldably urge piston 41 to close or partly close some of the ports 42 when cam lever 44 is in its fully open position. The strength of spring 51 is made such as to restrict the pump by-pass only sufficiently to maintain the desired small super-atmospheric pressure in the delivery lines at all times.

Fig. 1 illustrates diagrammatically the rear wheel brake cylinders 70 having opposed plungers 71 which are forced apart by the oil pressure in cylinder 70 to expand the internal brake shoes 72 against the brake drum 73. Any suitable and well known form of hydraulic brake cylinder may be employed. The duct 60 leads from the pump delivery port 27 and is divided into the two branches 61 and 62 which lead respectively to the two rear brake cylinders 70. The flexible ducts 63 and 64 permit the necessary relative movement between the chassis frame to which ducts 61 and 62 are secured and the brake cylinders 70 mounted upon the rear axle housing.

The front wheel brake cylinders 80 may be of any well known design and have been shown in Fig. 1 as similar to the rear brake cylinders 70. The front brake cylinders 80 are supplied with oil under pressure through duct 81 which has the two branches 82 and 83 leading respectively to the two front wheels. These branches 82 and 83 are also provided with short flexible lengths as clearly shown in Fig. 1. Oil under pressure is supplied to duct 81 from the manual pump cylinder 85 having a piston 86 which is actuated by the foot pedal 87, as clearly shown in Fig. 2. Oil is supplied to cylinder 85 by refill duct 88 which leads from the bottom of the oil reservoir 29 at the pipe connection 89. A check valve 90 in duct 88 prevents the return flow of oil when piston 86 compresses the oil in cylinder 85. It will now be clear that the front brake cylinders 80 are actuated to apply the brakes by the operator pressing down on the foot pedal 87. When the operator releases the foot pedal 87 it is returned by a suitable spring 91 and any additional oil which may be required to maintain the high pressure lines completely filled at all times flows through refill duct 88, past the check valve 90 into cylinder 85.

The means for causing the servo-pump to apply the rear wheel brakes simultaneously with the manual application of the front wheel brakes will now be described. The shaft 45 which operates the by-pass valve 40 is connected through the lever arm 100 to the piston 101 in cylinder 102. A duct 103 leads from the delivery of the manually operated cylinder 85 into cylinder 102, as clearly shown in Fig. 2. Now when the operator depresses foot pedal 87 the same pressure which obtains in cylinder 85 acts also to move piston 101. In other words, the force applied to move the piston 41 of the by-pass valve 40 varies directly with the oil pressure applied to the front brake cylinders. But we have seen above that the force upon piston 41 in any of its positions is directly proportional to the oil pressure applied to the rear brake cylinders. Hence the pressure on the rear brake cylinders will always bear a predetermined ratio to the pressure on the front brake cylinders. This ratio of course may be fixed at any desired value by choosing a suitable section area for piston 101, or by changing the length of lever arm 100, or by any other well known mechanical expedient such as will readily occur to those skilled in the art. Preferably this ratio is so chosen that the rear wheels can be locked by their brakes while the front wheels are still turning. This enables the maximum braking effect to be obtained without danger of locking the front wheels and thus preventing the proper steering of the vehicle.

A very important feature of the device is the safety means for actuating the servo-pump by-pass valve 40 in the event of failure of the front brake hydraulic system. Shaft 45 has a second lever arm 105 which is connected directly to foot pedal 87 by the telescoping links 106 and 107. The telescoping connection 108 has a spring 109 which yieldingly permits a change of length of the combined links 106 and 107. During normal actuation of shaft 45 by pistons 86 and 101 the lost motion between links 106 and 107 prevent their acting to turn shaft 45. However, in case either of pistons 86 or 101 fails to function properly, due to leakage of oil or any other cause, to turn shaft 45 then the links 106 and 107 will come into action to rotate shaft 45 according to the force exerted by the operator upon pedal 87. The spring 109 is of such strength that when pedal 87 is depressed its full travel until stopped by a suitable stop the piston 41 is yieldably held to cause the servo-pump 10 to build up a desired maximum pressure in the rear brake pressure lines. This also prevents an extra strong or careless operator from holding the by-pass valve 40 closed off to such an extent that damage will be caused to the servo-pump mechanism or to the drive mechanism therefor.

Fig. 3 shows a modified arrangement wherein a differential cylinder 120 is used instead of the two separate cylinders 85 and 102 in the arrangement shown in Fig. 2. The piston 101' operates in the portion 102' to actuate shaft 45 through the piston rod 99'. The piston 86' operates in the portion 85' to compress oil between the two pistons 86' and 101' and thus supply high pressure oil to the front brake cylinders through duct 81. The refill duct 88 acts in the same manner as in Fig. 2. It is thought the normal operation of the arrangement of Fig. 3 will be clear from the above description. In case of failure of high oil pressure in cylinder 120 when piston 86' moves to the left (due to a break or serious leakage in the front wheel hydraulic system) the inner end of piston rod 84' will engage the inner end of piston rod 99' and thus shaft 45 will be rotated by mechanical linkage to pedal 87.

It is therefore seen that in both Fig. 2 and Fig. 3 the servo-pump may be controlled by the pedal 87 to apply the rear wheel brakes even though the front wheel brake system should fail. Also it is obvious that in both forms of the invention the front wheel brakes may be applied by the foot power of the operator even though the servo-pump should fail from any possible cause, such for instance as the breakage of the propeller shaft or one of the driving axles of the vehicle which of course would prevent the forward motion of the vehicle from driving the servo-pump. The front wheel brake system is therefore independent of the rear wheel brake system and hence this invention renders unnecessary an emergency brake system such as ordinarily employed in addition to the service brake system.

In prior devices the emergency brakes and service brakes are operated by separate control levers or pedals. Hence when the service brakes fail an interval of time is necessarily lost before the operator learns of their failure and then applies the emergency brakes by means of a separate control lever or pedal. In this invention, however, if one set of brakes fails to function normally the second set of brakes will still be actuated by the same control pedal just as if the first set had not failed to function. Hence there will be no time lost in grasping for an emergency lever and no possibility of the operator failing to apply the good set of brakes due to his excitement at the moment.

While the form of embodiment of the present invention as herein disclosed, constitutes a preferred form, it is to be understood that other forms might be adopted, all coming within the scope of the claims which follow.

What is claimed is as follows:—

1. In a hydraulic braking system for a vehicle having front and rear road wheels, in combination, brake operating cylinders located adjacent said road wheels, a servo-pump for supplying fluid pressure to one set of said brake cylinders, a manually operated pump for supplying fluid pressure to the other set of said brake cylinders, and control means for maintaining a substantially constant ratio between the pressure supplied by the servo-pump and by the manual pump.

2. In a hydraulic braking system for a vehicle having front and rear road wheels, in combination, brake operating cylinders located adjacent said road wheels, a servo-pump for supplying fluid pressure to one set of said brake cylinders, a control means for regulating the fluid pressure supplied by said servo-pump, a manual pump for supplying fluid pressure to the other set of brake cylinders, and means for actuating said control means simultaneously with the actuation of said manual pump.

3. In a hydraulic braking system for a vehicle having front and rear road wheels, in combination, brake operating cylinders located adjacent said road wheels, a servo-pump for supplying fluid pressure to one set of said brake cylinders, a control means for regulating the fluid pressure supplied by said servo-pump, a manual pump for supplying fluid pressure to the other set of brake cylinders, and means controlled by the pressure supplied by said manual pump for actuating said control means.

4. In a hydraulic braking system for a vehicle, having front and rear road wheels, in combination, brake operating cylinders located adjacent said road wheels, a servo-pump for supplying fluid pressure to one set of said brake cylinders, a control means for regulating the fluid pressure supplied by said servo-pump, a manual pump for supplying fluid pressure to the other set of brake cylinders, and means for actuating said control means to cause said servo-pump to supply fluid pressure proportional to that supplied by said manual pump.

5. In a hydraulic braking system for a vehicle having front and rear road wheels, in combination, brake operating cylinders located adjacent said road wheels, a servo-pump for supplying fluid pressure to one set of said brake cylinders, a control valve for regulating the pressure supplied by said servo-pump, a manual pump for supplying fluid pressure to the other set of brake cylinders, and means for moving said control valve according to the pressure supplied by said manual pump to cause the pressure supplied by the servo-pump to maintain a predetermined ratio to the pressure supplied by the manual pump.

6. In a hydraulic braking system for a vehicle having two front wheels and two rear wheels and a brake operating cylinder at each wheel, in combination, manual means for supplying braking pressure to one set of wheel brake cylinders, servo-power means for supplying braking pressure to the other set of brake cylinders, and means for maintaining a predetermined ratio between the pressure supplied by said manual means and by said servo-power means.

7. In a hydraulic braking system for a vehicle having two front wheels and two rear wheels and a brake operating cylinder at each wheel, in combination, manual means for supplying braking pressure to the two front brake cylinders, servo-power means for supplying braking pressure to the rear brake cylinders, and means for maintaining a predetermined ratio between the pressure supplied by said manual means and by said servo-power means.

8. In a vehicle brake system, front wheel brakes, rear wheel brakes, manually operable common means for applying both such brakes, simple hydraulic means including an incompressible fluid medium between said common means and one set of brakes, servo-pump means between said common means and said other set of brakes, said servo pump means including a control member and connection between said control member and said common means.

9. The invention defined in claim 8 together with means to maintain a predetermined ratio between the force applied by said hydraulic means upon one set of said brakes, and the force exerted by said servo-pump means upon said other set of brakes.

10. The invention described in claim 8, said servo-pump means normally operable in series with said hydraulic means.

11. The invention defined in claim 8, said servo-pump means normally operable in series with said hydraulic means and exerting a force having a predetermined ratio both to the force exerted upon said common means and by said hydraulic means.

12. In a vehicle brake system, front wheel brakes, rear wheel brakes, common means for applying both sets of brakes, fluid means associated with said common means for applying one set of brakes, servo-pump means for actuating said other set of brakes, connections whereby said servo-pump means is operated by and in series with said fluid means, and other means between said common means and said servo-pump means to operate said second set of brakes upon the failure of the fluid means.

13. The invention set forth in claim 12, said last named means comprising links with a lost motion connection, between said common means and said servo-pump means.

14. In a vehicle brake system, a front pair of brakes, a rear pair of brakes, a common means for applying said pairs of brakes, hydraulic means including a fluid filled cylinder having a movable piston actuated by said common means for operating one pair of brakes, servo-pump means for operating said other pair of brakes, connections between said hydraulic means and said servo-pump means including a second fluid filled cylinder and a piston therein associated with said servo-pump means and a fluid tight connection between said cylinders.

15. The invention described in claim 14 together with other means providing an emergency connection between said common means and said servo-pump means comprising a pair of links with a lost motion connection between said common means and said servo-pump means.

16. In a hydraulic braking system for a vehicle having two front wheels and two rear wheels and a brake operating cylinder at each wheel, in combination, manual means for supplying braking pressure to one set of wheel brake cylinders, servo-power means for supplying braking pressure to the other set of brake cylinders, and means for maintaining the pressure supplied to the front wheel brake cylinders at a predetermined fraction of the pressure supplied to the rear wheel brake cylinders, whereby the braking effect at the rear wheels varies directly with but exceeds the braking effect at the front wheels.

17. In a vehicle brake system, a first brake, a second brake, a manually operable member, a conduit containing hydraulic medium for actuating said first brake, movable means operable upon said medium to apply the first brake by a movement of said medium, a mechanical connection between said manually operable member and said movable means, servo-pump means operatively connected to the second brake and means connecting said servo-pump means to said manually operable member.

In testimony whereof I hereto affix my signature.

GEORGE E. A. HALLETT.